US012632607B1

(12) United States Patent
Redford et al.

(10) Patent No.: US 12,632,607 B1
(45) Date of Patent: May 19, 2026

(54) DEEP NEURAL NETWORK LEARNING BASED TOOLS FOR EMBEDDED SYSTEMS UNDER SIDE CHANNEL ATTACKS

(71) Applicant: BLACK FUR INDUSTRIES, LLC, Tucson, AZ (US)

(72) Inventors: Ryan Redford, Irvine, CA (US); Roman Lysecky, Tucson, AZ (US); Janet Roveda, Tucson, AZ (US); Roberto Roveda, Tucson, AZ (US); Christophe Malterre, Tucson, AZ (US); Wo-Tak Wu, Tucson, AZ (US)

( * ) Notice: Subject to any disclaimer, the term of this patent is extended or adjusted under 35 U.S.C. 154(b) by 437 days.

(21) Appl. No.: 17/835,589

(22) Filed: Jun. 8, 2022

Related U.S. Application Data

(60) Provisional application No. 63/208,397, filed on Jun. 8, 2021, provisional application No. 63/208,356, filed on Jun. 8, 2021, provisional application No. 63/208,379, filed on Jun. 8, 2021, provisional application No. 63/208,296, filed on Jun. 8, 2021.

(51) Int. Cl.
| | |
|---|---|
| *G06F 21/72* | (2013.01) |
| *G06F 21/75* | (2013.01) |
| *G06N 3/08* | (2023.01) |

(52) U.S. Cl.
CPC .............. *G06F 21/72* (2013.01); *G06F 21/75* (2013.01); *G06N 3/08* (2013.01)

(58) Field of Classification Search
CPC ........... G06F 21/72; G06F 21/75; G06N 3/08; H04L 9/002; H04L 9/003
See application file for complete search history.

(56) References Cited

U.S. PATENT DOCUMENTS

| | | | | |
|---|---|---|---|---|
| 8,916,825 B1 * | 12/2014 | Egerton | .................... | G01J 5/24 |
| | | | | 250/338.4 |
| 9,196,766 B1 * | 11/2015 | Egerton | .................. | H10F 30/21 |
| 9,677,946 B1 * | 6/2017 | Egerton | ................ | H10F 77/122 |
| 9,945,720 B1 * | 4/2018 | Egerton | .................. | H10F 30/15 |
| 10,521,585 B2 | 12/2019 | Cheng et al. | | |
| 11,054,311 B1 * | 7/2021 | Oulachgar | ............. | G01J 5/024 |
| 11,277,255 B2 | 3/2022 | Satpathy et al. | | |
| 11,314,861 B2 | 4/2022 | Sun et al. | | |
| 11,599,633 B1 * | 3/2023 | Lin | ........................ | G06F 30/333 |
| 11,842,969 B2 * | 12/2023 | Blythe | .................. | H01L 23/576 |
| 12,222,899 B2 * | 2/2025 | Seth | ...................... | G06V 30/191 |
| 2003/0229598 A1 * | 12/2003 | de Jong | .............. | G06F 21/755 |
| | | | | 705/72 |
| 2008/0136641 A1 * | 6/2008 | Kean | ................ | G01R 31/31707 |
| | | | | 257/E23.179 |

(Continued)

OTHER PUBLICATIONS

Gilmore, Richard, Neil Hanley, and Maire O'Neill. "Neural network based attack on a masked implementation of AES." 2015 IEEE International Symposium on Hardware Oriented Security and Trust (Host). IEEE, 2015. (Year: 2015).*

(Continued)

*Primary Examiner* — David Garcia Cervetti
(74) *Attorney, Agent, or Firm* — HAYES SOLOWAY P.C.

(57) ABSTRACT

Disclosed is a method for detecting a side-channel attack (SCA) of an electronic target device, which method includes the steps of:
  a remote sensing EM radiations emanating from the target device;
  comparing the EM radiations with base line radiations; and
  identifying anomalies in said EM radiation.

5 Claims, 9 Drawing Sheets

(56) References Cited

U.S. PATENT DOCUMENTS

Figure 1:
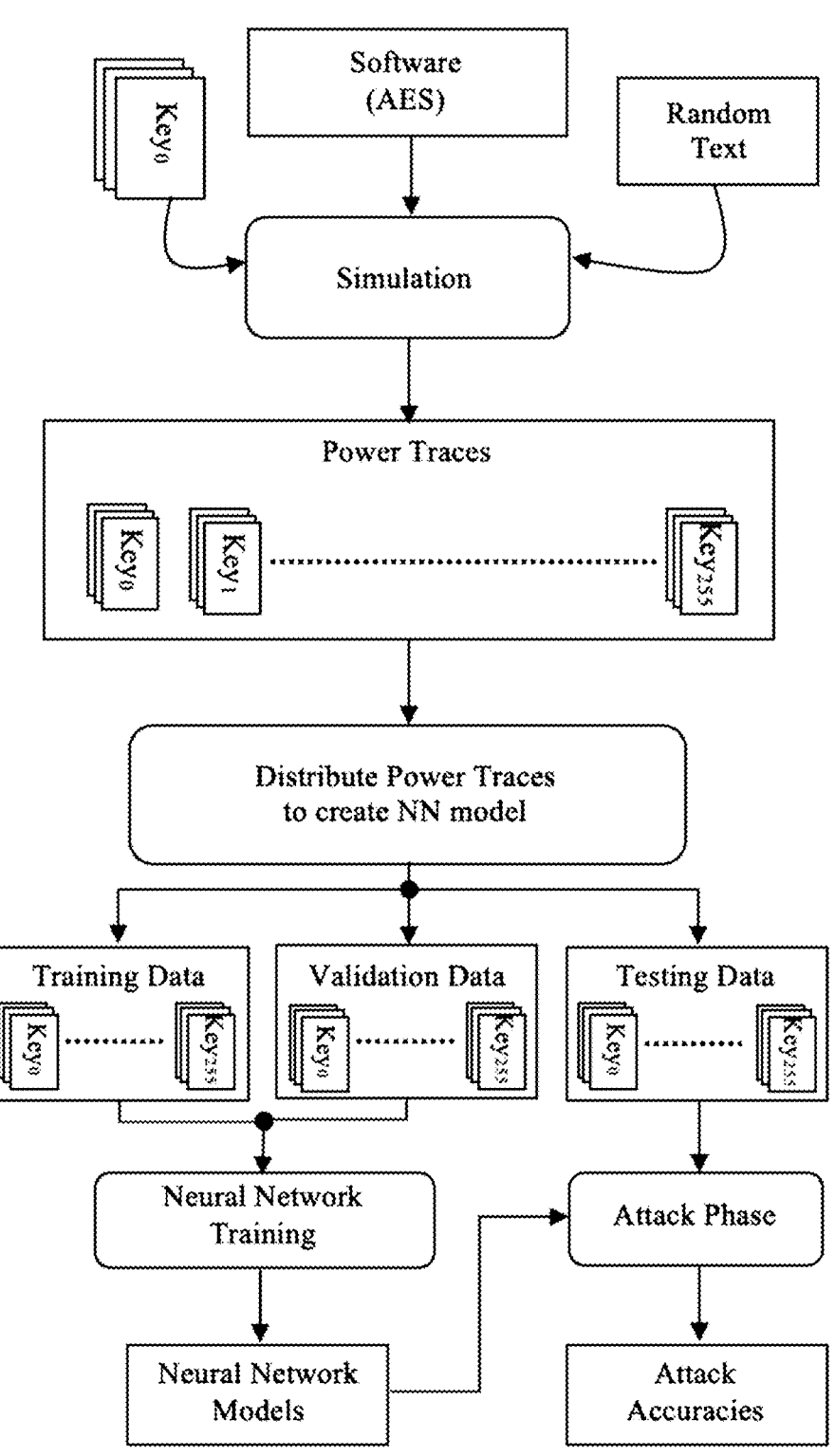

| | | | |
|---|---|---|---|
| 2010/0301873 A1* | 12/2010 | Nobukata | H04L 9/004 |
| | | | 356/213 |
| 2010/0332199 A1* | 12/2010 | Dhanekula | G06F 11/3093 |
| | | | 703/2 |
| 2011/0129084 A1* | 6/2011 | Fumaroli | G06F 21/755 |
| | | | 380/28 |
| 2013/0195266 A1* | 8/2013 | Fischer | H04L 9/0643 |
| | | | 380/44 |
| 2013/0264542 A1* | 10/2013 | Wu | G01J 5/0853 |
| | | | 257/21 |
| 2014/0143883 A1* | 5/2014 | Shen-Orr | H04L 9/003 |
| | | | 726/26 |
| 2014/0226813 A1* | 8/2014 | Heffner | H04L 63/0435 |
| | | | 380/44 |
| 2014/0348326 A1* | 11/2014 | Meyer | H04L 9/008 |
| | | | 380/255 |
| 2015/0103598 A1* | 4/2015 | Tasher | G11C 7/24 |
| | | | 365/185.04 |
| 2015/0316511 A1* | 11/2015 | Guo | H04B 10/27 |
| | | | 398/140 |
| 2015/0373035 A1* | 12/2015 | Patne | G06F 21/556 |
| | | | 726/25 |
| 2015/0373036 A1* | 12/2015 | Patne | G06F 21/755 |
| | | | 726/23 |
| 2016/0140340 A1* | 5/2016 | Walters | G06F 21/556 |
| | | | 726/22 |
| 2016/0148664 A1* | 5/2016 | Katoh | H04L 9/0866 |
| | | | 365/148 |
| 2016/0148679 A1* | 5/2016 | Yoshimoto | G11C 13/004 |
| | | | 365/148 |
| 2016/0148680 A1* | 5/2016 | Yoshimoto | G11C 13/0059 |
| | | | 365/148 |
| 2016/0357963 A1* | 12/2016 | Sherman | G06F 21/556 |
| 2017/0317220 A1* | 11/2017 | Fong | G01J 5/0803 |
| 2017/0345492 A1* | 11/2017 | Yoshimoto | G11C 7/24 |
| 2018/0097618 A1* | 4/2018 | Kumar | H03K 19/215 |
| 2018/0365195 A1* | 12/2018 | Rioul | H04L 9/002 |
| 2019/0228312 A1* | 7/2019 | Andoni | G06F 18/2433 |
| 2020/0089866 A1* | 3/2020 | Aguayo Gonzalez | G06F 21/44 |
| 2020/0313845 A1* | 10/2020 | Rioul | H04L 9/0618 |
| 2021/0026994 A1* | 1/2021 | Tehranipoor | G06F 30/343 |
| 2021/0150068 A1* | 5/2021 | Elenes | H01L 23/576 |
| 2021/0182437 A1* | 6/2021 | Satpathy | G06F 21/75 |
| 2021/0224452 A1* | 7/2021 | Lin | G06F 30/33 |
| 2022/0114422 A1* | 4/2022 | Hettwer | H04L 9/003 |
| 2022/0121938 A1* | 4/2022 | Hettwer | G06F 21/755 |
| 2022/0146322 A1* | 5/2022 | Fong | G01J 5/20 |
| 2022/0158817 A1* | 5/2022 | Hershman | H03K 19/0002 |
| 2022/0237332 A1* | 7/2022 | Emmert | G06F 21/74 |
| 2022/0318380 A1* | 10/2022 | Singh | G06F 21/86 |
| 2022/0366091 A1* | 11/2022 | Fransis | H01L 23/36 |
| 2023/0090750 A1* | 3/2023 | Winblad | H04L 9/0894 |
| | | | 380/270 |
| 2023/0224285 A1* | 7/2023 | Howe | H04L 9/3093 |
| | | | 713/166 |
| 2023/0334063 A1* | 10/2023 | Truong | G06F 16/9024 |
| 2024/0121084 A1* | 4/2024 | Miller | H04L 63/10 |
| 2025/0010483 A1* | 1/2025 | Cristache | B60L 53/53 |
| 2025/0047295 A1* | 2/2025 | Galvin | G06N 20/00 |

OTHER PUBLICATIONS

Chang, Norman, et al. "MI-augmented methodology for fast thermal side-channel emission analysis." Proceedings of the 26th Asia and South Pacific Design Automation Conference. Jan. 2021. (Year: 2021).*

Zoghi, Ali, and Hassan Rasooli Saghai. "Enhancing performance of graphene-based bolometers at 1 THz." Physica C: Superconductivity and its Applications 557 (2019): 44-48. (Year: 2019).*

Chong et al., Investigating Deep Learning Approaches on the Security Analysis of Cryptographic Algorithms, MDPI Cryptography, Sep. 2021 (Year: 2021).*

Lerman, Liran, et al. "Template attacks vs. machine learning revisited (and the curse of dimensionality in side-channel analysis)." Constructive Side-Channel Analysis and Secure Design: 6th International Workshop, COSADE 2015, Apr. 13-14, 2015. (Year: 2015).*

Picek, Stjepan, et al. "Side-channel analysis and machine learning: A practical perspective." 2017 International Joint Conference on Neural Networks (IJCNN). IEEE, 2017. (Year: 2017).*

Masure, Loïc, Cécile Dumas, and Emmanuel Prouff. "A comprehensive study of deep learning for side-channel analysis." IACR Transactions on Cryptographic Hardware and Embedded Systems, 2020 (Year: 2020).*

Das, Debayan, et al. "X-DeepSCA: Cross-device deep learning side channel attack." Proceedings of the 56th Annual Design Automation Conference 2019 (Year: 2019).*

Aydin, Furkan, et al. "DeePar-SCA: Breaking parallel architectures of lattice cryptography via learning based side-channel attacks." 20th International Conference, SAMOS 2020, Samos, Greece, Jul. 5-9, 2020, Proceedings 20. Springer International Publishing, 2020. (Year: 2020).*

Hettwer, Benjamin, Stefan Gehrer, and Tim Güneysu. "Applications of machine learning techniques in side-channel attacks: a survey." Journal of Cryptographic Engineering 10.2 (2020) (Year: 2020).*

So, Jaewoo. "Deep learning-based cryptanalysis of lightweight block ciphers." Security and Communication Networks 2020.1 (2020) (Year: 2020).*

* cited by examiner 240 mm 70 mm     28 mm

DEEP NEURAL NETWORK LEARNING BASED TOOLS FOR EMBEDDED SYSTEMS UNDER SIDE CHANNEL ATTACKS

CROSS REFERENCE TO RELATED APPLICATIONS

This applications claims priority to U.S. Provisional Patent Application Ser. No. 63/208,296, filed Jun. 8, 2021 and US Provisional Patent Application Ser. No. 63/208,356, filed Jun. 8, 2021, and US Provisional Patent Application Ser. No. 63/208,379, filed Jun. 8, 2021, and US Provisional Patent Application Ser. No. 63/208,397, filed Jun. 8, 2021, the contents of which are incorporated herein by reference.

STATEMENT OF FEDERALLY SPONSORED RESEARCH

Not Applicable

BACKGROUND OF THE DISCLOSURE

The present disclosure in one aspect relates to cyber security for embedded systems. The disclosure has particular utility for protecting military installations and equipment from side channel attack and will be described in connection with such utility, although other utilities are contemplated including, without limitation industrial and consumer applications including mobile communications systems such as smart phones and smart tablets, smart cars, smart homes, office and factory systems, hospitals and telemedicine systems, research facilities, utilities, government officials, schools and universities, i.e., essentially any facility or apparatus having an embedded system.

Not limited to weapon systems, embedded systems are integral parts of systems for use across a broad range of application domains, including communication systems, autonomous vehicles, drones, medical devices, smart grids, IoT, smart homes, etc. One of the key security requirements of embedded systems is protecting sensitive information (e.g., cryptographic keys). However, many embedded systems have limited resources (e.g., power, processing, memory) that limit which security measures can be implemented. As a result, embedded systems often are more susceptible to attacks that seek to exploit these limitations to extract sensitive information. Side channel attacks (SCAs) are one of the major threats to embedded devices. Embedded devices can leak sensitive information when performing operations involving the sensitive information. For example, when a device is encrypting and decrypting data, the device may leak information correlated to the cryptographic key through various side channels, such as power consumption. There are various types of side channel leakage's that have been used to statistically infer cryptographic keys from embedded devices, including power side channels [1], cache access pattern channels [2], and electromagnetic side channels [3].

SCAs first came to light in 1998 when Kocher et al. published their work on differential power analysis, showing for the first time that power traces from a device vary according to the secret key used during encryption and this key can be recovered using the statistical concept of difference of means and correlation [5]. This is an example of a non-profiled attack. Further research has led to profiled SCA approaches such as template attacks (TA) based on Gaussian assumptions [12] and stochastic analysis that relies on linear regression [13]. SCAs can be divided into two categories:

profiled attacks and non-profiled attacks. In a non-profiled attack, an attacker manually creates a side channel leakage model based on the prior knowledge of the target system, after which an attacker can retrieve the secret key by using stochastic correlation between the measured side channel from the target and the leakage model. Some examples of the non-profiled attacks explored in prior work include simple power analysis [4] differential power analysis [5], and correlation power analysis [6]. The effectiveness of these models is largely dependent on the quality of the generated leakage model and they are susceptible to multiple factors like, device architecture, software implementation, and manufacturing technology characteristics. Software based countermeasures [5], [7], [8] and hardware technology countermeasures [9], [10] that change power consumption characteristics have been shown to be effective against non-profiled SCAs.

Profiled SCAs, such as template attacks [11]-[13], use the complete side channel leakage, including system noise, for characterizing the target device. For every possible key, an attacker can directly profile and build a stochastic leakage template for the target device. For any leakage trace from the device, an attacker can then identify the secret key by determining which key's template is most correlated to the leakage trace. Since profiled SCA techniques use noise for building the templates, they are more robust to system noise and simple countermeasures [7], [12]. Countermeasures proposed in research include masking [5], [14], [15], random delay [16], shuffling [7], etc., but these techniques can only mitigate profiled attacks to a certain extent.

Recently, several approaches have begun exploring the use of neural networks in power-based SCAs. In [17], [18], researchers used single hidden layer neural network models to profile the system's power traces and use it to predict the secret key. Single layer neural networks also have been combined with PCA (principle component analysis) to reduce the features used as input for their model [19], [20]. PCA is good for reducing the dimensionality and complexity of the model, but it also can drop important features that could be useful in the classification task when conducting an attack. Further research has explored the use of convolutional neural networks [20], [21] and long short term memory models [20] to train and attack AES encryption. Importantly, these previous approaches assume that an identical system under full control of the attacker is required for profiling to construct the neural network model, which then can be used to attack the target system. In other words, these approaches result in neural network models for SCAs that are not portable across devices.

One of the challenges of profile-based SCAs is the portability of models between the device used for training and the target device being attacked. Here, we distinguish between two types of portability, inter-device portability and inter-architecture portability. Inter-device portability is the ability for a model constructed from one device to attack a difference instance of the device, but where the internal architecture of the two devices is identical. For inter-device portability, the differences between the training and attack devices primarily come from manufacturing variations and differing environmental conditions. Inter-architecture portability is the ability for a model trained on a device with one internal architecture (i.e., processor, cache, and memory configurations) to attack a device with a different internal architecture. Internal variations make portability analysis more difficult as they result in more significant changes in the corresponding power traces compared to identical internal devices as seen in inter-device portability.

Recently, Das et al. [22] explored the inter-device portability of neural network models for SCAs across numerous physical instances of the same device. This research showed that manufacturing variations and environmental conditions can have significant impact on the portability of neural network model across devices, which can be addressed by aggregating power traces from multiple devices during the neural network training. Notably, this portability addresses the physical differences between devices with the same processor architecture (i.e., all devices have the same processor/cache/memory configuration), but not the inter-architecture portability across devices with different processor architecture configurations. Numerous machine learning approaches have been used for profiled SCAs, including support vector machines [23]-[25], random forest [26], [27], rotation forest [28], MultiBoost algorithms [29], and K-nearest neighbors [30]. Researchers have compared machine learning (ML) techniques for SCAs to template attacks and demonstrate that with proper tuning of parameters these ML models outperform the standard template based attacks [31]. Moreover, research has shown that ML techniques outperform template attacks when dimensionality of input space is high [32].

Neural networks have shown considerable improvement over other ML techniques [20], [33] for SCAs. Moreover, Deep Neural Networks (DNNs) are able to learn non-linear and complex dependencies between the input features and outputs in SCAs, which has further improved the attack efficiency [34], [35]. Countermeasures, such as masking have also successfully broken using DNNs [20], [36]. But these approaches have targeted attacks on simple 8-bit microcontrollers. In contrast, the approach presented in the present disclosure in particular targets a more complex 32-bit ARM processor systems, including multiple cache level and main memory, to collect power traces for training and testing.

To reduce the dimensionality of the input layer, principal component analysis [37] has been applied to select points from the power trace for single S-box operation to be used as inputs to the neural network classification model [19], [36]. These approaches attempt to ensure the selected points show maximum variability as input features. However, this assumes that the power traces always show maximum variability at the selected points across all power traces. In [19], the effectiveness was evaluated using guessing entropy, which indicated a potential adversary would need on an average 4 guesses to predict the correct key. In contrast, the approach here will operate on the entire power trace of an entire AES encryption and without reducing the input size. If we were to compare our results using guessing entropy, an adversary would need on an average 1 guess to predict the correct key.

SUMMARY OF THE DISCLOSURE

An object of the present disclosure is to minimize the likelihood of successful cyber-attacks and real-time notifying of an attempted and successful cyber-attack. The specific objectives of the process can be enumerated as follows:

Collect performance data sets such as power traces and signal spectrums for embedded systems. Such systems may include sensors (e.g. Lidar, long-range low-light camera), communication units (Radar), and drone control system.

Establish Deep Learning Network for training and inferencing

Test and document findings

Prepare user manual and training materials

More particularly, on one aspect of the disclosure we provide a method for detecting a side-channel attack (SCA) of an electronic target device, comprising:

a remote sensing EM radiations emanating from the target device;

comparing said EM radiations with base line radiations; and identifying anomalies in said EM radiation. Preferably, the EM radiations are selected from the group consisting of visible light, radio wave, microwave and infrared radiation. More preferably the EM radiations are sensed using a bolometer, and the signals from the bolometers are collected on a graphene network, and including the step of feeding signals from the graphene network into a CPU to train a deep learning network.

In a particularly preferred embodiment, the GPU runs parallel with the target device being monitored.

The present disclosure also provides a method for retrieving encrypted data from an electronic target device, comprising emulating the target device and a similar model device having similar physical characteristics with power signals to generate a cycle-by-cycle power consumption trace and side channel traces for the target device and the model device, and employing deep neural networks (DNNs) deciphering encryption keys of the target device. Preferably the target device is a cell phone, firmware or a drone.

The present disclosure in one aspect provides a novel deep neural network (DNN) model using multiple hidden layers and nodes for a profiled SCA, specifically targeting the power side channel. Our approach enables the construction of a DNN model with both inter-architecture and inter-device portability that can be used to attack both systems with the same processor architecture and systems with different processor architecture configurations. Because of this ability, our method is unique and very different from existing approaches in that it does not need to have the device of interest but still is able to decipher the device's encryption keys through learned and trained DNN models. To summarize, our disclosure includes the following innovations and uniqueness:

A new, highly effective DNN model for power-based SCAs that achieves attack accuracy (particularly for deciphering 256 AES encryption keys) for inter-architecture portability across different computer processor architecture configurations. The following is a detailed overview of our DNN network model, highlighting the tuning of important hyper-parameters to yield a training procedure that ensures the resulting model achieves high attack accuracy when attacking both the original system and systems with different processor configurations.

A unique relaxation of the traditional requirements of SCAs which previously required an identical device (or minimally a device with an identical processor configuration) to construct the DNN model needed for the attack. Using numerous processor architecture configurations of varying complexity, we demonstrate the inter-architecture portability of DNN across these systems.

Validation that the resulting DNN models is constructed using power traces for the entire Advanced Encryption Standard (AES) execution, rather than focusing on individual S-box operations, thereby eliminating the need for Principle Component Analysis (PCA). By way of example, the following disclosure focuses on AES-128; however, the technique readily may be applied to different AES configurations (e.g. AES-256), modes, and alternative cryptographic algorithms.

Our methodology with deep neural networks (DNN) profiles power traces for an embedded processor system with high accuracy, on average 99.1% (AES-256). To our knowledge, no other approaches or methodologies can match this accuracy.

In one aspect of the disclosure, we use AI enhanced Bolometers to track and monitor EM performance. Based on resistive temperature sensors, Richards, Journal of Applied Physics 76,1 (1994) categorized bolometer into cooled, uncooled, composite, single element, linear and two-dimensional arrays, and more. The present disclosure employs single-element and simple amplifier circuits to achieve remote sensing for EM radiations that contribute relatively large fluxes and short integration times compared with what are from the universe. The Bolometer collects EM radiations with a large spectrum: visible light, radio wave, microwaves, IR etc. This Bolometer uses 3D printed Graphene as the resistive mesh with matching network as the front end. It feeds raw signals from this graphene network into a GPU to train a deep learning network. A trained Deep learning network is uploaded into a core that connects to the Bolometer to decide anomaly.

In still yet another aspect of the disclosure, we utilize machine learning and AI for buffer overflows, timing, system calls and integrate these parameters in one model. In this case, the AI emulates the behaviors of operating system running on hardware (cores). The training neural network is loaded on a core (FPGA, microprocessors such as ARM core, AMD core or GPU for example). Through USB, lighting cord, or additional wiring, the new core as a plug-and-protect component executes in parallel with the main mobile system. Without interfering with the main system runtime performance, this plug-and-protect component compares the runtime performance of the main mobile system and detects differences as anomalies. We also can use a Field-Programmable Gate Array (FPGA) to build additional plug-and-protect components to obfuscate timing and power consumptions.

In still yet another aspect of the disclosure we use power trace based, electromagnetic wave based SCAs to effectively decrypt AES, DES, SHA, RSA, ECC (all hardware Cryptography) encryption on two completely different devices: a defibrillator and an android phone. To crack the encryption keys, a multicore processor computer device or a GPU was used to inference system performance using a Deep Neural Network (DNN) and machine learning algorithms which emulate the software and hardware architecture of the target device. This also allows for the tuning of the expected performance traces (filtering cross-talk) of a particular chip set design, L-1 and L-2 cache, and its RAM configurations, effectively making very accurate predictions about the encryption keys.

DETAILED DESCRIPTION OF OUR DISCLOSURE

Collect Power Traces for Deep Neural Network Training

FIG. 1 presents an overview of our DNN-based SCA methodology that consists of four phases: simulation, power trace collection, training, and attack. We use a simulation-based method in order to simulate the system execution for different processor configurations. The Gem5 [48] simulator and McPAT [49] are used to simulate the software execution for 128-bit AES encryption [50] and produce cycle-accurate power trace for each execution during the AES encryption. Each simulation executes the AES encryption for a specific key and plaintext input on the target processor architecture. The power trace collection phase simulates the execution of a specific processor architecture for all possible keys with randomized plaintext inputs. The attack phase tries to predict the first byte of the secret key, which gives 256 ($2^8$) possible key byte values. For each possible key byte value, the simulation phase generates 21,000 power traces using random plaintext for each execution. The power traces are then divided into 3 sets: training set with 15,000 power traces for each possible key byte value (15,000×256=3,840,000 total power traces), validation set with 5,000 power traces per key byte value (1,280,000 total power traces), and testing set with 1,000 power traces per key byte value (256,000 total power traces).

Figure 2:
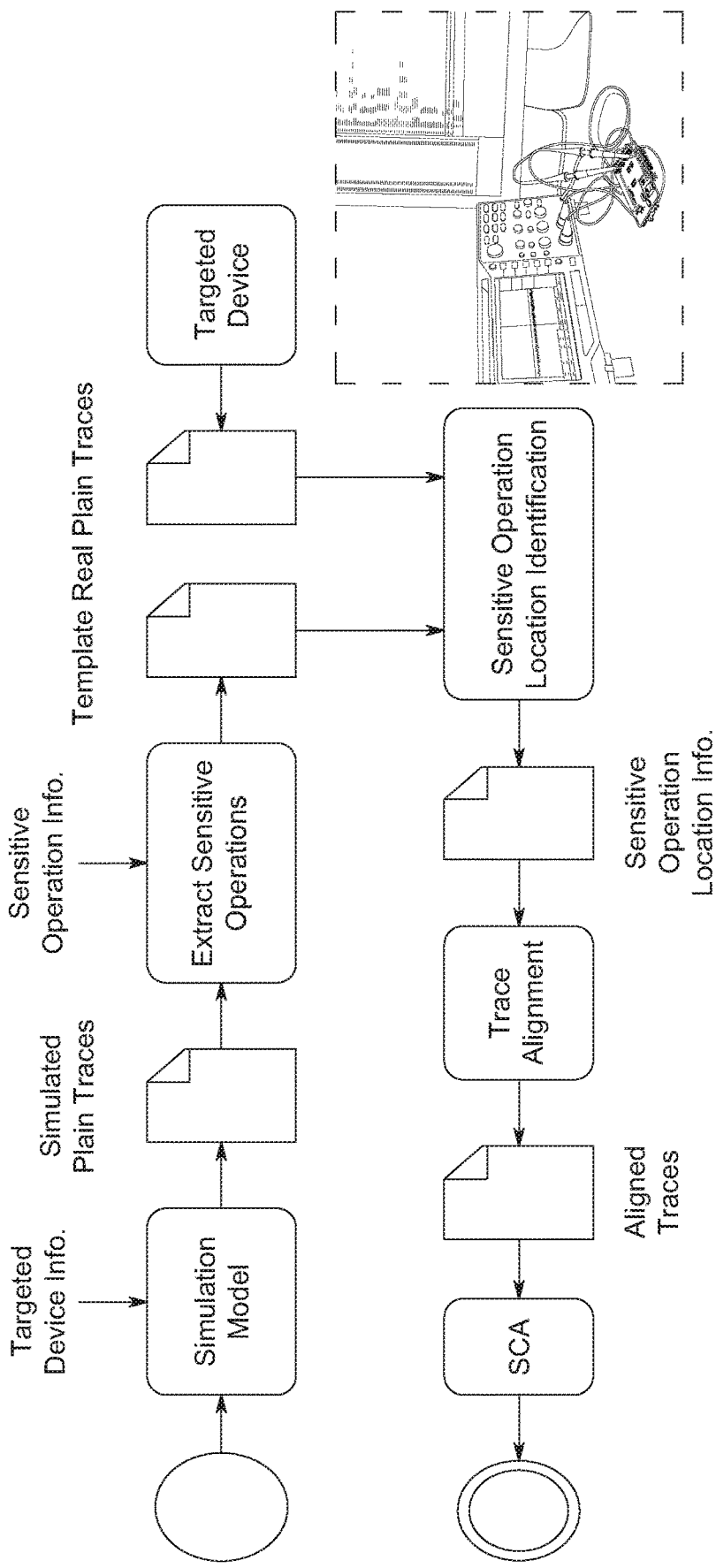

FIG. 2 further shows the power trace collecting procedure. In training phase, the power traces in the training set and validation set are used to train and tune the DNN network model. We formulate various neural network models and tune hyper-parameters like training data size, number of hidden layers, number of nodes per hidden layers, batch size for training, activation functions after the hidden layers, etc. using the validation set. Each model is tuned and the best model is finally selected based on its performance on the validation set. The final DNN model for each processor configuration, which is the best model evaluated using the validation set, is used during the attack phase to evaluate the model accuracy. Specifically, the trained DNN is used to attack each power trace within the attack set, resulting in a predicted value for the first byte of the secret key. The model accuracy is the percentage of power traces within the attack set for which the correct key is predicted. The same procedure in FIG. 2 is applicable to other embedded systems.

Figure 3:
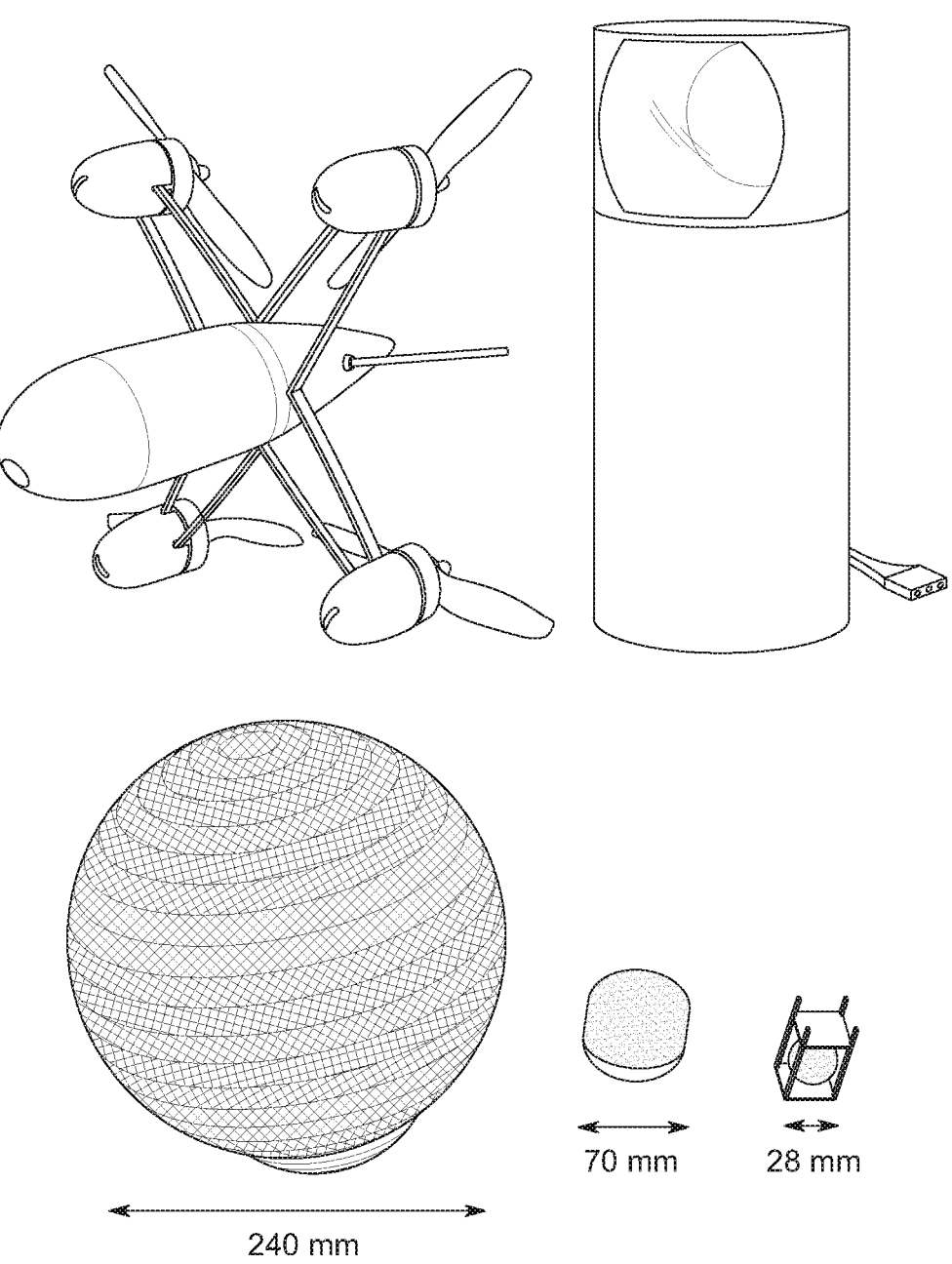

By way of example, we can collect data for three additional embedded systems: one Lidar unit (not shown), one 3D printed antenna, one long-range low light camera, and one drone, e.g., as illustrated in FIG. 3.

Develop Deep Neural Network to Protect Against SCAs

Figure 4:
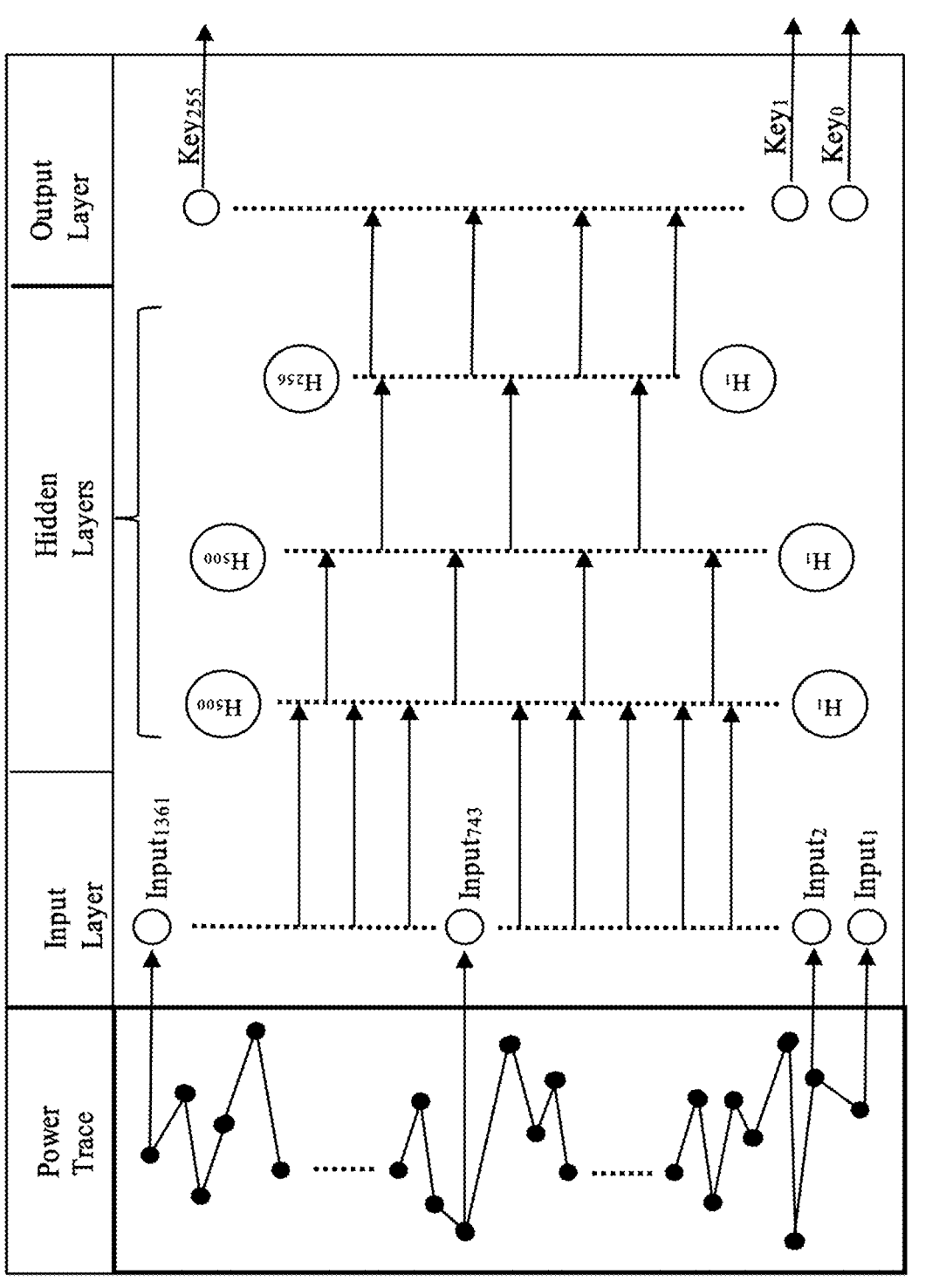

FIG. 4 presents an overview of the DNN architecture used for both inter-device and inter-architecture portability analysis in accordance with our disclosure. The DNN model for power-based SCAs has an input layer with 1361 nodes, which corresponds to the number of cycles required for the AES encryption. Notably, the full cycle-accurate power trace is input to the DNN, which specifically avoids using any techniques to reduce the dimensionality of the input. Power traces are normalized to a range of [1, −1] with a mean value of 0 before being input to the DNN. This normalization ensures the large differences in raw power measurements do not lead to learned weights being too big or too small. The hidden layers within the DNN help to learn relations between features in order to correctly predict the outcome. The hidden layers are crucial layers in the model and require tuning to determine the number of layers and node sizes that maximize the model accuracy. Given the model tuning discussed below, the resulting DNN model tuned for power-based SCAs has 3 hidden layers with 500 nodes in the first two layers and 256 nodes in the last hidden layer.

Finally, the last layer in the DNN model is the output layer, which typically corresponds to the number of possible outcomes the model is predicting. The output layer has 256 nodes corresponding to the 256 possible values for the first key byte. The DNN uses a softmax [51] layer following the output layer to predict exactly one output key. The activation function used within the neural network model determines how the model learns non-linearities between features and expected outputs. The Rectified Linear Unit (ReLu) [52]-[54], defined as $\sqrt{f(x)} = \max(0,x)$, is a widely used activation function in deep neural networks. We have found that deep neural networks are optimized better and faster with ReLu than with other activation functions like tanh [55], [56] and sigmoid [54], because the gradients are large and consistent when the node is active during training. This ensures the model does not saturate during training. All hidden layer nodes are followed by ReLu activation functions. Dropouts [57] in neural networks are a recent addition that helps during training to not overfit the model to the training data, thereby ensuring the model remains generalizable over a large data set. During training the derivative received by each parameter tells the model how it should change such that final loss function is reduced. This means that nodes are changed so as to fix mistakes in other nodes, which may lead to complex co-adaptations and overfitting. Dropouts attempt to avoid this effect by masking a few random input and hidden layer nodes during training. This approach gives the model less data and capacity to learn (i.e., less capacity to overfit), which helps ensure the model learns which features matter most for the target problem.

Training and Tuning Deep Neural Network for a Given Embedded System

Neural network training is a complex process of tuning and finding the right balance between various parameters that affect the accuracy and how the model is trained. The parameters are called hyper-parameters for training. Hyper-parameters typically include the size of training data, number of hidden layers, number of nodes per hidden layer, number of training iterations, activations functions to use, dropout percentage on each hidden node, and batch size to use during training. These hyper-parameters are not an exhaustive list, but rather are exemplary for training a DNN model for power-based SCAs. Tuning of hyper parameters is done using the validation data set. Test data will only be used after all the parameters are tuned so as not to bias our models to tune to test data set. This section describes how we tuned each parameter to determine the final DNN configuration which performed the best for predicting the cryptographic key with power traces of an AES encryption.

Figure 5:
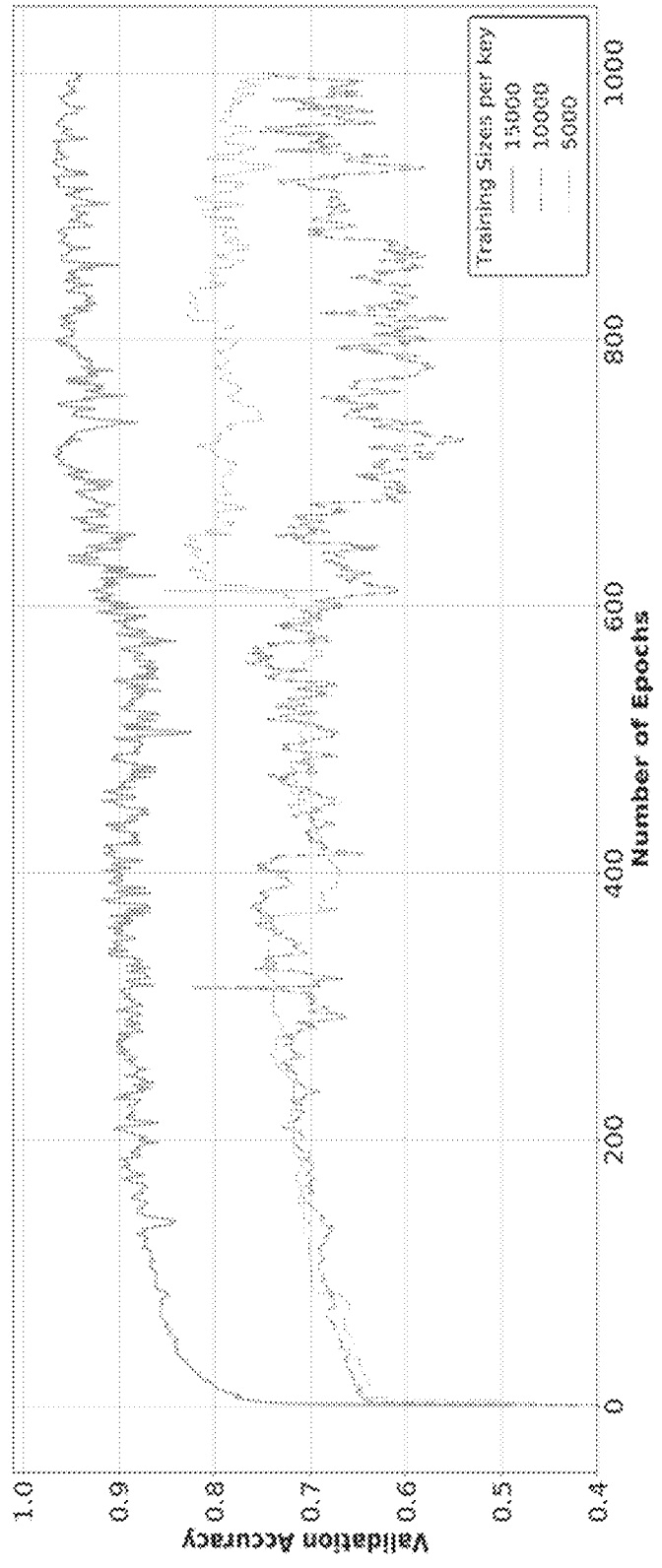

Tuning Training Size Unlike other neural network tasks, we can control the size of the data used to create the DNN model. The size of the training data must be large enough to ensure the model can learn the features required to differentiate between power traces for different secret keys. Having less data means the model may not be able to learn on sufficient power trace features and generalizes poorly. On the other hand, a training size that is too large would provide little or no improvement in the model performance and come at the expense of unnecessarily long training time. There is a sweet spot in the training data size where the resulting model performs best with a reasonable training time. We explored different training sizes for our DNN model, including training sizes of 5000, 10000, and 15000 power traces per key. FIG. 5 presents the resulting validation accuracy during the training phase across each training epoch for the three training sizes. A training size of 15000 power traces yields a validation accuracy of 94.9% after 1000 epochs. In contrast, training sizes of 5000 and 10000 only achieved a validation accuracy 75.3% and 73.6%, respectively, which are cases of underfitting due to insufficient data.

Figure 6:
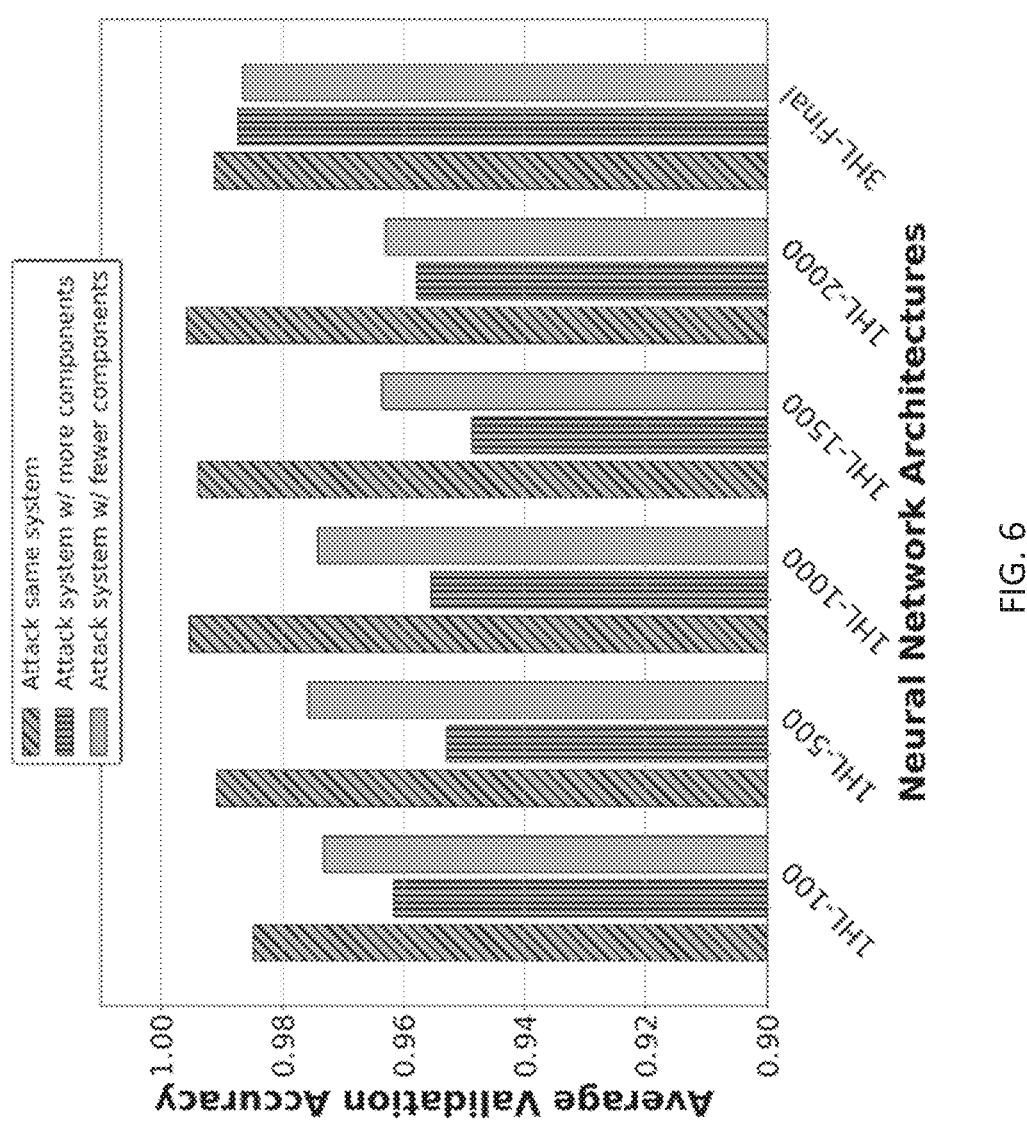

Investigating Number of Hidden Layers We have found that having a deeper neural network (i.e., neural networks with more hidden layers) is more efficient than having a wider network (i.e., a neural network with a single hidden layer with more nodes) [60]. To explore the architectures for power-based SCAs, we explored neural networks architectures with varying numbers of hidden layers and nodes per hidden layer. We started by considering a single hidden layer with 100 nodes, and increasing either the number of nodes per layer or the number of layers until a model accuracy greater than 98% was achieved. FIG. 6 presents the average validation accuracy for several single layer neural networks and our final DNN with three hidden layers. We considered three validation accuracies for comparison: 1) attacking the same system, where the model was trained on a system and validation accuracies were calculated on the same system; 2) attacking a different system with more components, where the model was trained on a system and validation accuracies were calculated on more complex systems with more architectural components than the trained system; and 3) attacking a different system with fewer components, where the model was trained on a system and validation accuracies were calculated on systems with fewer components than the trained system. When attacking the same system on which the model was trained, the single hidden layer models perform well, with average accuracies ranging from 98.4% to 99.6%. Even, our final DNN model with three hidden layers shows comparable performance of 99.1%. However, when attacking different systems, specifically systems with more architectural features (e.g., cache levels), the single hidden layer models result in a decrease in accuracy ranging from 94.8% to 96.1%, whereas our DNN model still achieves an accuracy of 98.7%.

Tuning Batch Size While training a neural network, the training method modifies the weights of the neural network to reduce the loss seen at the output. The size of the data used to carry out this step is called batch size. Batch size can be one of three types: 1) batch mode where the batch size is equal to the full training data, 2) mini-batch mode where the batch size is less than the full training data and greater than 1, and 3) stochastic mode where the batch size is equal to 1. An epoch consists of a pass over the entire training data on the neural network to calculate the weight updates. Numerous training epochs are typically needed to train a DNN. In mini batch mode, each epoch uses multiple iterations to train the model on batches of the training data. After each batch, the weight updates are calculated and applied to the model. Thus, during one epoch of a mini-batch mode, several weight updates are made. This can be seen as taking a weighted average of the weights over the training data, and has shown to be better at converging with better results for our dataset. Using the mini-batch mode, the batch size can affect the resulting accuracy of the DNN model. We evaluated different batch sizes ranging from 64 (26) to 16384 (214). For each batch size, the trained model is used to attack other configurations. We assume that similar variations will be seen for other configurations, and hence we are tuning batch sizes only for configuration 3.1 (refer to Table I). It can be observed that the accuracy increases until reaching a batch size of 1024, and then decreases with further increases in the batch size. To understand this trend, we compared the data points for batch sizes 64, 1024 and 16384.

Refining Dropouts Dropouts have shown to be good a regularizer which help in reducing overfitting to training data [57]. Dropouts can be placed after any layer in a neural network. For our model, we used dropouts after each hidden layer. Specifically, we temporarily discarded a random percentage of the hidden layer nodes during the optimization phase of training. For fine tuning the dropout percentage, we again considered the training data for configuration 3.1 and use the DNN architecture shown in FIG. 6. The dropout percentage for hidden layers was varied from 0-50% in 10% increments to generate six different DNN models. These six models were then used to attack all 12 configurations as shown in Table 1. For portability of DNN models, overfitting on training data will make the model less efficient on data from other models. The average accuracy increase as the dropout percentage increases from 0% to 30%. With no dropouts, the model is overfit to the training data and is not able to perform better on other configurations. But as we increase the dropout, the model is now able to learn features that can be generalizable over other configurations too.

Investigating the Number of Training Epochs The number of training epochs is another crucial hyper-parameter during training. Training for less epochs would lead to the neural network model not learning all the features causing poor performance. Whereas training for more epochs than required, the model will overfit on the features and will perform poorly on unseen data. Research has shown that early stopping [61], [62] also avoids overfitting the model on the training data. Early stopping is an approach that stops the training when there is a decrease in the model performance on unseen data. In this case, power traces within the validation set are used to determine the early stopping criteria. The key idea here is that model's performance on unseen data will either saturate or decrease if we start overfitting on the training data. In the ideal case, the neural network model should achieve validation performance close to desired attack performance before training is stopped. During training, we use early stopping with a patience of 5 epochs, which means we stop training if the performance on the validation set does not increase for 5 consecutive epochs. This ensures that each DNN model generated for each configuration is trained optimally every time to give the best performance.

Testing and Experimental Setup

Within our current approach, we use cycle-accurate simulation and power analysis of device models to create templates for different processor architecture configurations to attack the power side channel. To test the feasibility and effectiveness of DNNs, we apply our DNN methodology to predict the first byte of the cryptographic key used in a 128-bit AES encryption, using the ARM Embed AES ECB [50] implementation. The resulting cardinality of the secret key set is 256. Since all 128 bits of the secret key are independent, an attack on one byte is sufficient to show the feasibility of our method, which can be repeated for each key. We apply the proposed approach to attacking several embedded systems architectures. Specifically, we target several ARM-based embedded devices with different L1 and L2 caches and off-chip memory. We note that for the target class of embedded systems, the primary variations power consumption typically come from the processor, cache, and memory subsystems. Additionally, the target embedded systems use in-order execution pipelines. As such, we currently focus our approach on the processor core, L1 cache, L2 cache, and memory components, instead of focusing on the internal configuration of the processor pipeline, which is left as future work.

Table I presents the processor architecture configurations thereof for the 12 targeted embedded devices. The target processor architecture configurations are labeled using the format X.Y, where X indicates the number of components in the system, and Y identifies each unique configuration thereof. For example, configuration 3.1 is the first target configuration with three components, and configuration 5.3 is the third target configuration with five components. Each target configuration consists of the same ARM Cortex-A32 processor core with different cache and memory configurations. We considered four L1 instruction cache configurations varying in size (32K or 64K) and associativity (2-way or 8-way), two L1 data cache configurations of size 64K with varying associativity (2-way or 8-way), and four unified L2 cache configurations varying in size. The power modeling considered in the presented approach includes the power consumed by the processor, L1 and L2 caches, and memory when executing an AES encryption. We used the ARM Embed AES ECB implementation for AES encryption [50]. We used a Gem5 simulator [48] to simulate processor states as well as cache and memory access traces for each given system. The processor states were used in combination with an ARM processor power model to generate a cycle-by-cycle power consumption trace of the target processor. The cache and memory activity traces, along with typical physical characteristics for embedded system caches and memories, were fed into the memory organization power modeling tool McPat [49] to generate a corresponding cycle-by-cycle power trace. The final power traces account for power dissipation by the processor, L1 caches, L2 cache, and memory. As we were using simulation to generate the power traces, only one power sample per clock cycle is needed to reconstruct the power trace during simulation. This is different when one is collecting data from a real device, where the sampling frequency should be at least twice that of the maximum operating frequency of the target device to reconstruct the power trace without any errors (per Nyquist's Theorem).

TABLE I

| Processor | I Cache | | D Cache | | L2 Cache | | |
|---|---|---|---|---|---|---|---|
| Adrchitecture Config-urations | Asso-cia-tivity | Size | Asso-cia-tivity | Size | Asso-cia-tivity | Size | Memory Size |
| 3.1 | 2 | 32 k | 2 | 64 k | N/A | | N/A |
| 3.2 | 8 | 32 k | 8 | 64 k | | | |
| 3.3 | 2 | 64 k | 2 | 64 k | | | |
| 3.4 | 8 | 64 k | 8 | 64 k | | | |
| 4.1 | 2 | 32 k | 2 | 64 k | 8 | 2 Mb | |
| 4.2 | 8 | 32 k | 8 | 64 k | 8 | 2 Mb | |
| 4.3 | 2 | 32 k | 2 | 64 k | 16 | 4 Mb | |
| 4.4 | 8 | 64 k | 8 | 64 k | 16 | 4 Mb | |
| 5.1 | 2 | 32 k | 2 | 64 k | 8 | 2 Mb | 1024 Mb |
| 5.2 | 8 | 32 k | 8 | 64 k | 8 | 2 Mb | 1024 Mb |
| 5.3 | 2 | 64 k | 2 | 64 k | 16 | 4 Mb | 1024 Mb |
| 5.4 | 8 | 64 k | 8 | 64 k | 16 | 4 Mb | 1024 Mb |

Table II presents the accuracy of our DNN approach for both attacking the same processor architecture configuration on which a model was trained (i.e., inter-device portability) and attacking different processor configurations with difference in the target processor's architectural configuration (i.e., inter-architecture portability). Table columns indicate the processor configuration on which the DNN was trained, and table rows indicate the processor configurations attacked. For example, the first row and second column (ignoring headings) indicate the attack accuracy for a DNN trained on processor configuration 3.2 when attacking configuration 3.1, in which an accuracy of 98.2% is achieved. First, we compared the performance of the inter-device portability of DNN when attacking the same processor configuration on which the DNN was trained. These results are in the cells along the diagonal of the table. The average accuracy is 99.1%, with a minimum and maximum of 89.4% and 100%, respectively. Notably, for ten of the 12 configurations, an accuracy of 100% is achieved, indicating a perfect prediction of the secret key across all 256000 (1000 traces per key value) power traces within the testing set. One of the goals of our DNN method is to enable a DNN trained on one processor architecture configuration to be effective in attacking different architectural configurations. In contrast, previous research has focused on evaluating SCAs when the training and target system to attack, have the same processor architecture. To analyze the effectiveness of attacking different processor architecture configurations, we characterized the analysis based on the complexity of the processor configurations, specifically three-, four-, and five-component configuration. For three-component configurations, the average accuracy when attacking another three-component configuration was 99.3%. For four-component configuration, the average accuracy when attacking another four-component configuration was 100%. And, for the most complex five-component configurations considered, the outliers are the models for configurations 3.1, 4.2, and 5.4 when attacking configuration 5.2. For those scenarios, the average attack accuracy was 81.4%. Again, not wishing to be bound by theory, we hypothesize the reason for this is that the data for configuration 5.2 has more variance in the features for each key, which is not seen when training models 3.1, 4.2, and 5.4. The second group of outliers is the model for configuration 5.4 when attacking configurations 5.1, 5.2, 5.3, and itself. The attack accuracy for configuration 5.4's models when attacking itself is the lowest among all the configurations, specifically the attack accuracy was just 89.4%. Comparatively, the next lowest accuracy for a model attacking the configuration from which it was built was 99.9%. This suggests that the trained model is finding it difficult to learn features. Given configuration 5.4 is the most complex configuration, it's not unexpected that it would exhibit the lower attack accuracy. However, the large jump in attack accuracy is surprising.

TABLE II

| | | | | | | Processor architecture configurations used to train DNN | | | | | | |
| | | 3.1 | 3.2 | 3.2 | 3.4 | 4.1 | 4.2 | 4.3 | 4.4 | 5.1 | 5.2 | 5.3 | 5.4 |
|---|---|---|---|---|---|---|---|---|---|---|---|---|---|
| Processor | 3.1 | 99.99 | 98.22 | 98.05 | 98.05 | 98.21 | 98.05 | 98.05 | 98.05 | 98.05 | 97.77 | 98.05 | 94.81 |
| architecture | 3.2 | 98.27 | 100 | 100 | 100 | 100 | 100.00 | 100 | 100 | 100 | 99.99 | 100 | 93.48 |
| configurations | 3.3 | 98.29 | 100 | 100 | 100 | 100 | 100.00 | 100 | 100 | 100 | 99.99 | 100 | 93.61 |
| attacked | 3.4 | 98.27 | 100 | 100 | 100 | 100 | 100.00 | 100 | 100 | 100 | 99.99 | 100 | 93.48 |
| | 4.1 | 98.27 | 100 | 100 | 100 | 100 | 100.00 | 100 | 100 | 100 | 99.99 | 100 | 93.48 |
| | 4.2 | 98.27 | 100 | 100 | 100 | 100 | 100.00 | 100 | 100 | 100 | 99.99 | 100 | 93.48 |
| | 4.3 | 98.27 | 100 | 100 | 100 | 100 | 100.00 | 100 | 100 | 100 | 99.99 | 100 | 93.48 |
| | 4.4 | 98.27 | 100 | 100 | 100 | 100 | 100.00 | 100 | 100 | 100 | 99.99 | 100 | 93.48 |
| | 5.1 | 96.69 | 100 | 100 | 100 | 100 | 100.00 | 100 | 100 | 100 | 99.98 | 100 | 87.94 |
| | 5.2 | 85.79 | 98.66 | 94.62 | 99.33 | 98.13 | 88.91 | 98.22 | 99.75 | 99.69 | 100 | 99.64 | 69.58 |
| | 5.3 | 96.69 | 100 | 100 | 100 | 100 | 100.00 | 100 | 100 | 100 | 99.98 | 100 | 87.94 |
| | 5.4 | 96.55 | 98.81 | 98.44 | 99.54 | 99.47 | 98.44 | 98.44 | 99.39 | 99.33 | 98.41 | 99.62 | 89.43 | average accuracy when attacking another five-component configuration was 95.7%. While the five-component configuration has the lowest performance against other component configurations, as the configuration complexity grows, the accuracy for four-component configurations is higher than three-component configurations.

Figure 7:
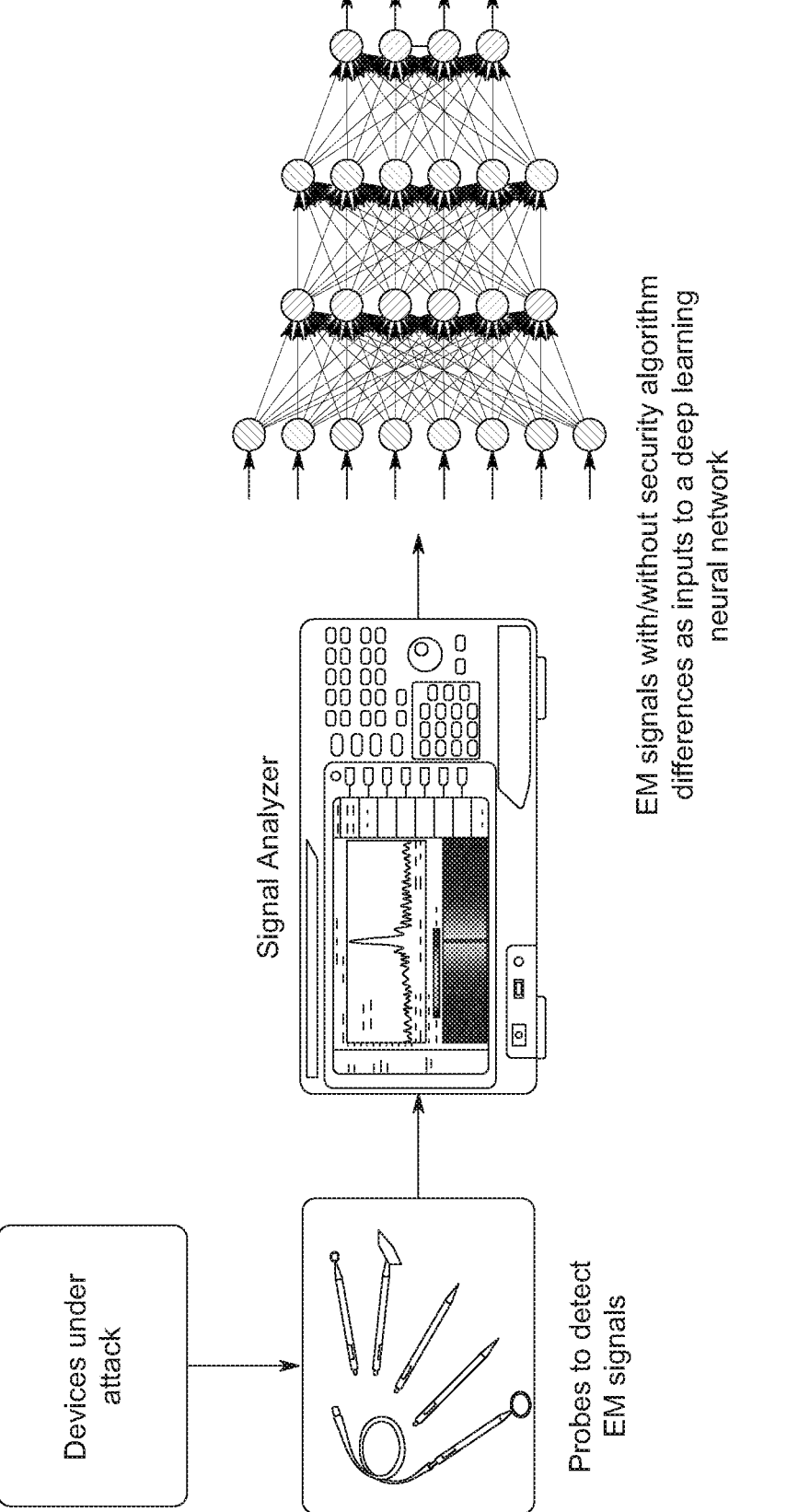
Figure 8:
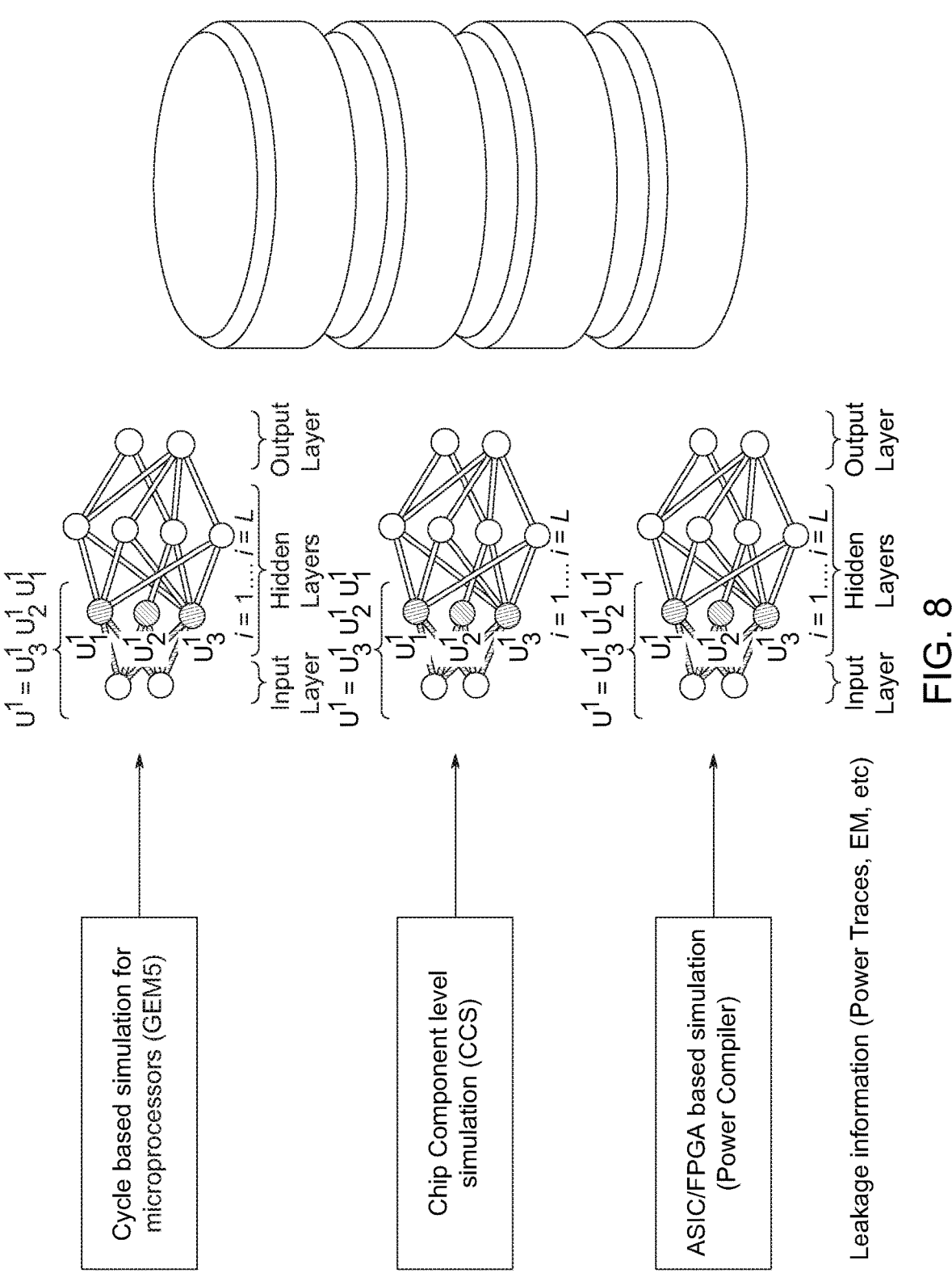

We further analyzed the general trends when a DNN model trained on processor architecture configurations with fewer components attack configurations with more components and vice-versa. Generally, a DNN trained on a more complex configuration is more effective in attacking a configuration with fewer components. While not wishing to be bound by theory, it is believed this is likely because the power traces of the higher component include the power consumption of the components. In other words, when we train our model on a more complex configuration, we inherently get training features seen in the less complex configurations power traces. This hypothesis is further strengthened by analyzing the extreme cases of three-component configuration model attacking a five-component configuration, and vice-versa. The average performance for three-component configuration model attacking a five-component configuration was 97.8%, compared to 98.1% for a five-component configuration model attacking a three-component configuration. The accuracy of five-component models on three-component configurations was further increased to 99.5% if we omit the results for the configuration 5.4 model, which has the worst attack accuracy on itself. The portability for most of the DNN models was observed to be more than 95% on average. There are few outliers (see Table II) that can be divided into two groups. The first group of Various changes may be made without departing from the spirit and scope of the present disclosure. For example, in another aspect of the disclosure we may use deep neural network based tools for embedded systems under attack with cEM (Electromagnetic Radiation) performance. FIG. 7 demonstrates the use of probes and signal analyzer to collect EM signals as inputs to train deep neural network models. This methodology would allow the trained neural network to decipher encryption keys through EM SCA attacks. In addition to signal analyzer, we can also use Bolometers to collect EM signals from distance. More particularly, applying the above teachings, we can train neural network models for power traces and signal outputs (data packets) with basic components (e.g. different types of communication chips such as Bluetooth, WiFi, RF, and network router, computation chips such as random number generator, accelerators, and other general components registers, CPUs, caches, memory components) for sensors, weapons, and communication systems. During this task, we study different activation functions and different neural network structures and their correlations with these various basic components. Employing this knowledge, we then can identify neural network models for basic components and in turn develop a common library for neural network models for research in side channel attacks, block chain security and communication security. With this system we can create AI trustable libraries for common chips. The several prominent chip fabrication companies, i.e., Texas Instrument Incorporated, Analog Devices Inc., Taiwan Semiconductor Corporation, Arm, Ltd., etc offer chip datasheets and simulation tools at the circuit level. The present disclosure allows us to provide security chip level models to allow Field-Programmable Gate Arrays (FPGAs) and Application-Specific Integrated Circuits (ASICs) to emulate existing hardware and software components. This in turn permits us to provide technology gaps in replacing outdated parts, for example, in the current weapon systems. Such libraries can be mapped onto FPGAs, Graphics Processing Units (GPUs) and other ASICs to perform real time emulations for cyber security, bitcoin mining, situation simulation, digital foot prints, and other applications. We also can employ network approaches such as AWDL (Apple Wireless Direct Link) to use low end phone communicate high end system and identify weak attack points for phones in a communication network. See FIG. 8.

Figure 9:
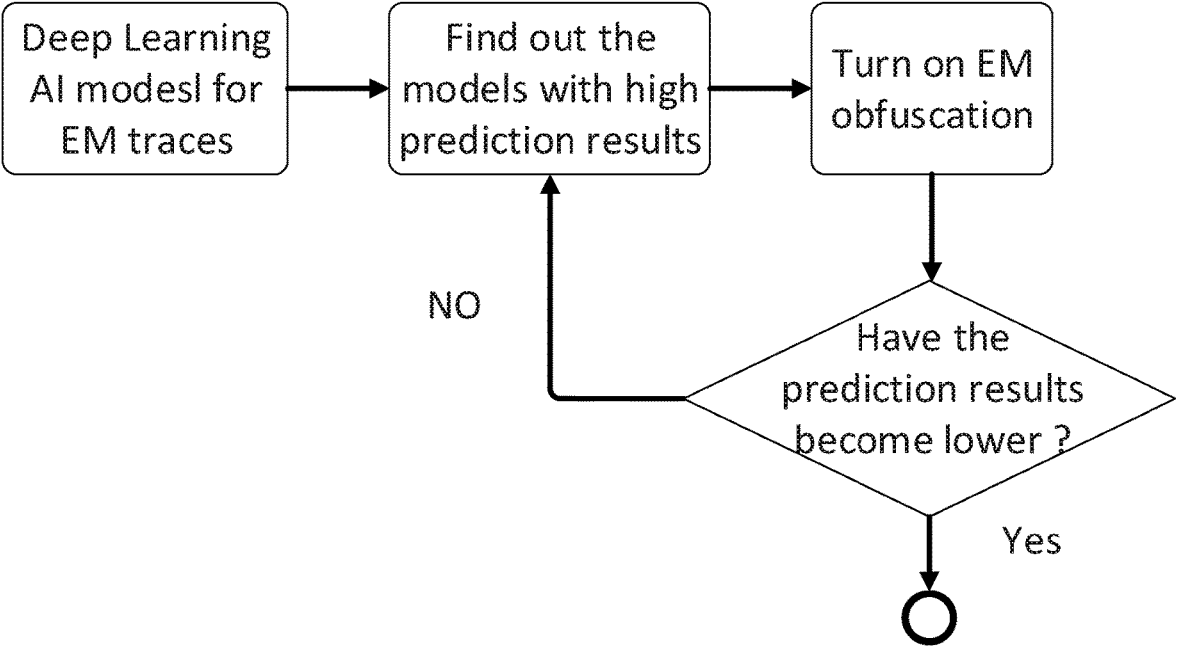

In yet another embodiment of the disclosure, we may use deep neural network learning based tools as above described for attack runtime monitoring and device obfuscation of various devices, including phones, biomedical sensors, communication equipment, weapons, PC, tablets, and other mobile devices such as drones, etc, to provide cyber protection to protect information on these and other devices. FIG. 9 illustrates an algorithmic flow of how systematically we use Deep learning model and obfuscation approaches to reduce the likely hood of the SCA attacks. The same flow can be applied to both EM signals and power traces.

In still yet another aspect of the disclosure, we use deep neural network (DNN) techniques as above described to retrieve encrypted data from cell phones and the like.

US law enforcement, CBP, DHS, ATF, DEA, FBI, ACTT, the Secret Service and supporting US intelligence agencies are tasked to protect the American public and the innocent from organized crime, lone wolfs, terrorist organizations as well as from covert foreign operatives. Our front lines and supporting agencies lack the adequate tools to expeditiously recover data from encrypted devices seized upon the arrest of sophisticated suspects and, as such adversaries are predisposed to not collaborate. The capability to recover actionable intelligence data from encrypted devices within 48 hours is highly desirable and can reduce risks to public safety under a variety of scenarios.

This operational capability gap has been revisited in high profile cases across administrations such as the 2015 Dec. 2 San Bernardino, shooting which left 14 civilians dead and 22 injured and more recently with the US Naval Air Station Pensacola shooting which left 3 serviceman dead and 8 others wounded on Dec. 6, 2019. FBI Director Christopher Wray stated in a news conference: "The struggle to unlock the encrypted phones delayed the probe for months and potentially jeopardized public safety", Director Ray added: "the delay would've given any potential co-conspirators months to delete evidence and prevent the FBI from piecing together the whole trail".

For broader use, leveraging interrogation techniques and confronting the suspects with the evidence against them retrieved from their cell phones or other encrypted devices, the suspects generally will opt for a plea-bargain bargain. This in turn will provide significant savings of resources such as legal and agent investigative time commitments, gathering of witness testimonies, depositions, cross-examinations during pre-trial and all preparation efforts leading up to trial. Having expeditious cell phone data evidence is expected to save dozens to hundreds of man hours per case when a plea bargain is reached. Such a capability is projected to allow our front lines to more quickly return to their primary field work enabling our public servants to spend more time apprehending other dangerous individuals which would otherwise walk free.

As mentioned above, deep neural network (DNN) learning based tools may be used to create a database for chips, discrete components, modules, and systems under attack.

A side-channel attack is any attack based on information gained from the implementation of a computer system, rather than a weakness in the implemented algorithm itself—no need for a backdoor which will make systems vulnerable to legitimate users. Generally speaking, side channel patterns generated from target system can be used as inference hint of target system execution state. By exploiting side channel leakages, we can retrieve critical information from target system which includes the encryption keys of target devices. Limitations of traditional SCAs required the extensive profiling/training to decipher a specific system however this no longer is the case.

Building upon knowledge gained from the research to mitigate present and future risks of Side channel attacks (SCAs) as above disclosed, we have found that using power trace based, electromagnetic wave based SCAs we could effectively decrypt Advanced Encryption Standard (AES), Data Encryption Standard (DES), Secure Hash Algorithm (SHA), Rivest-Shamir-Adleman (RSA) and Error Correction Code (ECC), (all hardware Cryptography) encryption on two completely different devices: a defibrillator and an android phone. To crack the encryption keys, a multicore processor computer device or a GPU was used to inference system performance using a Deep Neural Network (DNN) and machine learning algorithms which emulate the software and hardware architecture of the target device. This also allows for the tuning of the expected performance traces (filtering cross-talk) of a particular chip set design, L-1 and L-2 cache, and its RAM configurations, effectively making very accurate predictions about the encryption keys.

By way of example, for DHS, law enforcement, NSA and the US DoD this is a potential game changing capability to protect the country from foreign adversaries, from organized crime and to help protect the innocent (e.g., provide means by which we can more effectively detect, apprehend, and convict human smugglers and organized criminal organizations whom exploit women and children).

In addition to using our Deep Neural Network and data sets to decrypt smart phones such as iPhones, and other devices of interest to law enforcement, we may use similar methods to leverage electromagnetic leakage from the target devices to successfully decrypt the keys on any pre-trained target devices that are not RF shielded. This information also allows us to conjointly create SCAs counter measures to secure systems or telecommunication networks. The countermeasures that are in place today to mitigate SCA risks are ineffective.

As the vast majority of phone data extractions only requires the data stored on the phones themselves (no social media extraction necessary) to leverage a plea bargain by confronting the offenders with the evidence. Thus, the ability to expeditiously unlock a cell phone may lead to a substantial economy of investigative and legal resources. This capability may provide significant savings of resources such as prosecutorial and agent investigative time commitments, gathering of witness testimonies, depositions, cross-examinations, and lengthy trial and pre-trial processes. Having expeditious cell phone or other computer device evidence may save dozens to hundreds of man hours per case when a plea bargain is reached. Such a capability may allow our front lines to more quickly return to their primary field work enabling us to spend more time apprehending other dangerous individuals which would otherwise walk free.

Leveraging encrypted devices' data evidence also will enable law enforcement to identify other perpetrators at the scene, linking narcotrafficking apprehensions to scouts and in other cases linking perpetrators as accessories in murder or manslaughter investigations, linking individuals who could not otherwise be linked to a crime beyond a reasonable doubt and otherwise walk free.

Side channel attacks also can provide added CONOPS in support of, for example, DHS, CBP and US Law Enforcement agencies and the US DoD missions, to mitigate common DJI drone risks—some of which have been weaponized by waring drug cartels, there is some concerns that some of these weaponized drones could make it across our border. SCAs also can provide new CONOPS to counter autonomous drone threats such as the ones identified by SOUTH-COM or near pear adversaries such as Iran.

SCAs also can be used to enable the appropriate government agencies to recover, from the firmware, with added steps the source code from devices such as: captured drones, as well as from associated computer and electronic devices recovered from foreign adversaries, drug cartels and drones illegally flying across a country's border. We also have the capability to enable for example the DoD and DHS/Law Enforcement to trace recovered drones and associated devices back to their source of origin and by leveraging appropriate approved Cyber programs we can provide means, methods and training to scale up effective cyber surveillance tools and training.

This allows intelligence agencies to map out illegal narcotrafficking networks that may have ties to known terrorist organizations. Having access to the firmware could also enable government cyber tools to change the way points, trajectory and landing sites of a drone for example could be modified depending on the expected topography based on Inertial Guidance Systems data or GPS data. Also, Side Channel attacks, using electromagnetic waves, rather than power traces may be used to exploit enemy missiles guidance systems, fire control systems and Radar. This is because power-based SCA's training methods are very similar to Electromagnetic Waves SCAs and increasing the data sets of various chip configurations of target devices will allows for Deep Neural Network configurations to be already digitized in a simulation model dramatically reducing development times for developing electromagnetic wave SCAs.

Still other modifications are possible.

REFERENCES

[1] Y. Lu, K. H. Boey, M. O'Neill, and J. V McCanny, "Practical comparison of differential power analysis techniques on an ASIC implementation of the AES algorithm," in IET Irish Signals and Systems Conference (ISSC 2009), 2009, pp. 1-6.

[2] D. Page, "Theoretical Use of Cache Memory as a Cryptanalytic Side-Channel," IACR Cryptol ePrint Arch, vol. 2002, p. 169, 2002.

[3] K. Gandolfi, C. Mourtel, and F. Olivier, "Electromagnetic Analysis: Concrete Results," in Cryptographic Hardware and Embedded Systems—CHES 2001, 2001, pp. 251-261.

[4] R. Mayer-Sommer, "Smartly Analyzing the Simplicity and the Power of Simple Power Analysis on Smartcards," in Cryptographic Hardware and Embedded Systems—CHES 2000, 2000, pp. 78-92.

[5] P. C. Kocher, J. Jaffe, and B. Jun, "Differential Power Analysis," in Proceedings of the 19th Annual International Cryptology Conference on Advances in Cryptology, 1999, pp. 388-397.

[6] E. Brier, C. Clavier, and F. Olivier, "Correlation Power Analysis with a Leakage Model," in Cryptographic Hardware and Embedded Systems—CHES 2004, 2004, pp. 16-29.

[7] N. Veyrat-Charvillon, M. Medwed, S. Kerckhof, and F.-X. Standaert, "Shuffling against Side-Channel Attacks: A Comprehensive Study with Cautionary Note," in Advances in Cryptology—ASIACRYPT 2012, 2012, pp. 740-757.

[8] J.-S. Coron and L. Goubin, "On Boolean and Arithmetic Masking against Differential Power Analysis," in Cryptographic Hardware and Embedded Systems—CHES 2000, 2000, pp. 231-237.

[9] Z. Chen and Y. Zhou, "Dual-Rail Random Switching Logic: A Countermeasure to Reduce Side Channel Leakage," in Cryptographic Hardware and Embedded Systems—CHES 2006, 2006, pp. 242-254.

[10] T. Popp and S. Mangard, "Masked Dual-Rail Precharge Logic: DPA-Resistance Without Routing Constraints," in Cryptographic Hardware and Embedded Systems—CHES 2005, 2005, pp. 172-186.

[11] F.-X. Standaert, F. Koeune, and W. Schindler, "How to Compare Profiled Side-Channel Attacks?," in Applied Cryptography and Network Security, 2009, pp. 485-498.

[12] S. Chari, J. R. Rao, and P. Rohatgi, "Template Attacks," in Cryptographic Hardware and Embedded Systems—CHES 2002, 2003, pp. 13-28.

[13] W. Schindler, K. Lemke, and C. Paar, "A Stochastic Model for Differential Side Channel Cryptanalysis," in Cryptographic Hardware and Embedded Systems—CHES 2005, 2005, pp. 30-46.

[14] M. Rivain and E. Prouff, "Provably Secure Higher-Order Masking of AES," in Cryptographic Hardware and Embedded Systems, CHES 2010, 2010, pp. 413-427.

[15] S. Chari, C. S. Jutla, J. R. Rao, and P. Rohatgi, "Towards Sound Approaches to Counteract Power-Analysis Attacks," in Advances in Cryptology—CRYPTO' 99, 1999, pp. 398-412.

[16] J.-S. Coron and I. Kizhvatov, "Analysis and Improvement of the Random Delay Countermeasure of CHES 2009," in Cryptographic Hardware and Embedded Systems, CHES 2010, 2010, pp. 95-109.

[17] Z. Martinasek and V. Zeman, "Innovative Method of the Power Analysis," Radioengineering, vol. 22, pp. 586-594, 2013.

[18] Z. Martinasek, J. Hajny, and L. Malina, "Optimization of Power Analysis Using Neural Network," in Smart Card Research and Advanced Applications, 2014, pp. 94-107.

[19] Z. Martinasek, L. Malina, and K. Trasy, "Profiling Power Analysis Attack Based on Multi-layer Perceptron Network," in Computational Problems in Science and Engineering, N. Mastorakis, A. Bulucea, and G. Tsekouras, Eds. Cham: Springer International Publishing, 2015, pp. 317-339.

[20] H. Maghrebi, T. Portigliatti, and E. Prouff, "Breaking Cryptographic Implementations Using Deep Learning Techniques," in Security, Privacy, and Applied Cryptography Engineering, 2016, pp. 3-26.

[21] E. Cagli, C. Dumas, and E. Prouff, "Convolutional Neural Networks with Data Augmentation Against Jitter-Based Countermeasures," in Cryptographic Hardware and Embedded Systems—CHES 2017, 2017, pp. 45-68.

[22] D. Das, A. Golder, J. Danial, S. Ghosh, A. Raychow-dhury, and S. Sen, "X-DeepSCA: Cross-Device Deep Learning Side Channel Attack," in Proceedings of the 56th Annual Design Automation Conference 2019, 2019, pp. 134:1-134:6.

[23] G. Hospodar, B. Gierlichs, E. De Mulder, I. Ver-bauwhede, and J. Vandewalle, "Machine learning in side-channel analysis: a first study," J Cryptogr Eng, vol. 1, no. 4, p. 293, October 2011.

[24] V. N. Vapnik, The Nature of Statistical Learning Theory. Berlin, Heidelberg: Springer-Verlag, 1995.

[25] Z. Zeng, D. Gu, J. Liu, and Z. Guo, "An Improved Side-Channel Attack Based on Support Vector Machine," in 2014 Tenth International Conference on Computational Intelligence and Security, 2014, pp. 676-680.

[26] L. Breiman, "Random Forests," Mach Learn, vol. 45, no. 1, pp. 5-32, October 2001.

[27] H. Patel and R. O. Baldwin, "Random Forest Profiling Attack on Advanced Encryption Standard," Int J Appl Cryptol, vol. 3, no. 2, pp. 181-194, June 2014.

[28] J. J. Rodriguez, L. I. Kuncheva, and C. J. Alonso, "Rotation Forest: A New Classifier Ensemble Method," IEEE Trans Pattern Anal Mach Intell, vol. 28, no. 10, pp. 1619-1630, October 2006.

[29] Y. Freund and R. E. Schapire, "A Decision-Theoretic Generalization of On-Line Learning and an Application to Boosting," J Comput Syst Sci, vol. 55, no. 1, pp. 119-139, August 1997.

[30] Z. Martinasek, V. Zeman, L. Malina, and J. Martinasek, "k-Nearest Neighbors Algorithm in Profiling Power Analysis Attacks," Radioengineering, vol. 25, pp. 365-382, 2016.

[31] S. Picek et al., "Side-channel analysis and machine learning: A practical perspective," in 2017 International Joint Conference on Neural Networks (IJCNN), 2017, pp. 4095-4102.

[32] L. Lerman, R. Poussier, O. Markowitch, and F.-X. Standaert, "Template attacks versus machine learning revisited and the curse of dimensionality in side-channel analysis: extended version," J Cryptogr Eng, vol. 8, no. 4, pp. 301-313, November 2018.

[33] S. Bhasin, A. Chattopadhyay, A. Heuser, D. Jap, S. Picek, and R. R. Shrivastwa, "Mind the Portability: A Warriors Guide through Realistic Profiled Side-channel Analysis." 2019.

[34] E. Prouff, R. Strullu, R. Benadjila, E. Cagli, and C. Canovas, "Study of Deep Learning Techniques for Side-Channel Analysis and Introduction to ASCAD Database," IACR Cryptol ePrint Arch, vol. 2018, p. 53, 2018.

[35] Z. Martinasek, P. Dzurenda, and L. Malina, "Profiling power analysis attack based on MLP in DPA contest V4.2," in 2016 39th International Conference on Tele-communications and Signal Processing (TSP), 2016, pp. 223-226.

[36] R. Gilmore, N. Hanley, and M. O'Neill, "Neural network based attack on a masked implementation of AES," in 2015 IEEE International Symposium on Hard-ware Oriented Security and Trust (HOST), 2015, pp. 106-111.

[37] I. Jolliffe, "Principal Component Analysis," in Interna-tional Encyclopedia of Statistical Science, M. Lovric, Ed. Berlin, Heidelberg: Springer Berlin Heidelberg, 2011, pp. 1094-1096.

[38] S. Picek, I. P. Samiotis, J. Kim, A. Heuser, S. Bhasin, and A. Legay, "On the Performance of Convolutional Neural Networks for Side-Channel Analysis," in SPACE, 2018.

[39] J. Kim, S. Picek, A. Heuser, S. Bhasin, and A. Hanjalic, "Make Some Noise. Unleashing the Power of Convolu-tional Neural Networks for Profiled Side-channel Analy-sis," IACR Cryptol ePrint Arch, vol. 2018, p. 1023, 2018.

[40] G. Perin, B. Ege, and J. van Woudenberg, "White paper: Lowering the Bar: Deep Learning for Side-Channel Analysis," July 2018.

[41] N. Hanley, M. O'Neill, M. Tunstall, and W. P. Marnane, "Empirical evaluation of multi-device profiling side-channel attacks," in 2014 IEEE Workshop on Signal Processing Systems (SiPS), 2014, pp. 1-6.

[42] M. O. Choudary and M. G. Kuhn, "Efficient, Portable Template Attacks," IEEE Trans Inf Forensics Secur, vol. 13, no. 2, pp. 490-501, February 2018.

[43] D. P. Montminy, R. O. Baldwin, M. A. Temple, and E. D. Laspe, "Improving cross-device attacks using zero-mean unit-variance normalization," J Cryptogr Eng, vol. 3, no. 2, pp. 99-110, June 2013.

[44] M. Renauld, F.-X. Standaert, N. Veyrat-Charvillon, D. Kamel, and D. Flandre, "A Formal Study of Power Variability Issues and Side-Channel Attacks for Nanoscale Devices," in Advances in Cryptology—EU-ROCRYPT 2011, 2011, pp. 109-128.

[45] O. Choudary and M. G. Kuhn, "Template Attacks on Different Devices," in Constructive Side-Channel Analy-sis and Secure Design, 2014, pp. 179-198.

[46] H. Wang, M. Brisfors, S. Forsmark, and E. Dubrova, "How Diversity Affects Deep-Learning Side-Channel Attacks." 2019.

[47] A. Golder, D. Das, J. Danial, S. Ghosh, S. Sen, and A. Raychowdhury, "Practical Approaches Toward Deep-Learning-Based Cross-Device Power Side-Channel Attack," IEEE Trans Very Large Scale Integr Syst, vol. PP, pp. 1-14, 2019.

[48] N. Binkert, R. Dreslinski, L. Hsu, K. T. Lim, A. Saidi, and S. K. Reinhardt, "The M5 Simulator: Modeling Networked Systems," IEEE Micro, vol. 26, pp. 52-60, 2006.

[49] S. Li, J. H. Ahn, R. D. Strong, J. B. Brockman, D. M. Tullsen, and N. P. Jouppi, "McPAT: An integrated power, area, and timing modeling framework for multicore and manycore architectures," in 2009 42nd Annual IEEE/ACM International Symposium on Microarchitecture (MICRO), 2009, pp. 469-480.

[50] "ARM MBED AES," 2017. [Online]. Available: https://tls.mbed.org/aes-source-code. [Accessed: 20 May 2017].

[51] I. Goodfellow, Y. Bengio, and A. Courville, "Deep Learning," MIT Press, 2016, pp. 180-184.

[52] R. H. R. Hahnloser, R. Sarpeshkar, M. A. Mahowald, R. J. Douglas, and H. S. Seung, "Digital selection and analogue amplification coexist in a cortex-inspired silicon circuit," Nature, vol. 405, no. 6789, pp. 947-951, 2000.

[53] K. Jarrett, K. Kavukcuoglu, M. Ranzato, and Y. LeCun, "What is the best multi-stage architecture for object recognition?," in 2009 IEEE 12th International Confer-ence on Computer Vision, 2009, pp. 2146-2153.

[54] V. Nair and G. E. Hinton, "Rectified Linear Units Improve Restricted Boltzmann Machines," in Proceed-ings of the 27th International Conference on International Conference on Machine Learning, 2010, pp. 807-814.

[55] X. Glorot, A. Bordes, and Y. Bengio, "Deep Sparse Rectifier Neural Networks," in Journal of Machine Learn-ing Research, 2010, vol. 15.

[56] A. L. Maas, A. Y. Hannun, and A. Y. Ng, "Rectifier nonlinearities improve neural network acoustic models," in in ICML Workshop on Deep Learning for Audio, Speech and Language Processing, 2013.

[57] N. Srivastava, G. Hinton, A. Krizhevsky, I. Sutskever, and R. Salakhutdinov, "Dropout: A Simple Way to Prevent Neural Networks from Overfitting," J Mach Learn Res, vol. 15, pp. 1929-1958, 2014.

[58] F. Chollet and others, "Keras." 2015.

[59] M. Abadi et al., "TensorFlow: Large-Scale Machine Learning on Heterogeneous Distributed Systems." 2016.

[60] I. Goodfellow, Y. Bulatov, J. Ibarz, S. Arnoud, and V. Shet, "Multi-digit Number Recognition from Street View Imagery using Deep Convolutional Neural Networks," in ICLR2014, 2014.

[61] A. Graves, A. Mohamed, and G. Hinton, "Speech recognition with deep recurrent neural networks," in 2013 IEEE International Conference on Acoustics, Speech and Signal Processing, 2013, pp. 6645-6649.

[62] Y. Kim, "Convolutional Neural Networks for Sentence Classification," in Proceedings of the 2014 Conference on Empirical Methods in Natural Language Processing, (EMNLP), Oct. 25-29, 2014, Doha, Qatar, A meeting of SIGDAT, a Special Interest Group of the (ACL), 2014, pp. 1746-1751.

[63] D. Kingma and J. Ba, "Adam: A Method for Stochastic Optimization," Int Conf Learn Represent, 2014.

[64] F.-X. Standaert, T. G. Malkin, and M. Yung, "A Unified Framework for the Analysis of Side-Channel Key Recovery Attacks," in Advances in Cryptology—EUROCRYPT 2009, 2009, pp. 443-461.

The invention claimed is:

1. A method for detecting a side-channel attack (SCA) of an electronic target device, comprising:

remote sensing EM radiations emanating from the target device; wherein the EM radiations are selected from the group consisting of visible light, radio wave, microwave and infrared radiation, and wherein the EM radiations are sensed using a bolometer;

collecting EM signals from the bolometer on a graphene network, and feeding the EM signals from the graphene network into a core comprising a GPU configured to run parallel with the target device to train a deep learning network and track and monitor EM performance, wherein the EM signals are collected as inputs to train the deep learning network, wherein the GPU runs parallel with the target device being monitored to inference a target system performance via the deep learning network and emulate a software or hardware architecture of the target device;

comparing said EM radiations with base line radiations; and identifying differences in the EM radiation as anomalies.

2. A method for retrieving encrypted data from an electronic target device, comprising emulating the target device and a similar model device having similar physical characteristics with EM radiation power signals to generate a cycle-by-cycle power consumption trace and side channel traces for the target device and the model device, wherein emulating the target device and a similar model device employs the method of claim 1, and employing deep neural networks (DNNs) deciphering encryption keys of the target device.

3. The method of claim 2, wherein the target device is a cell phone.

4. The method of claim 1, wherein the target device comprises firmware.

5. The method of claim 1, wherein the target device comprises a drone.

* * * * *